(No Model.) 2 Sheets—Sheet 1.
T. COAD.
VOLTAIC BATTERY.
No. 395,769. Patented Jan. 8, 1889.
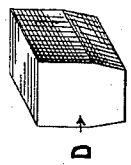
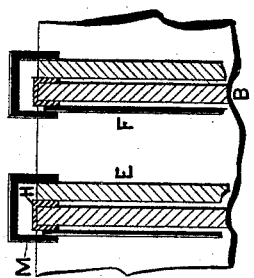
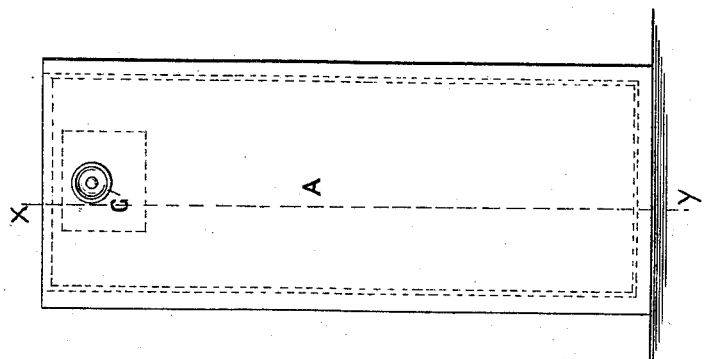
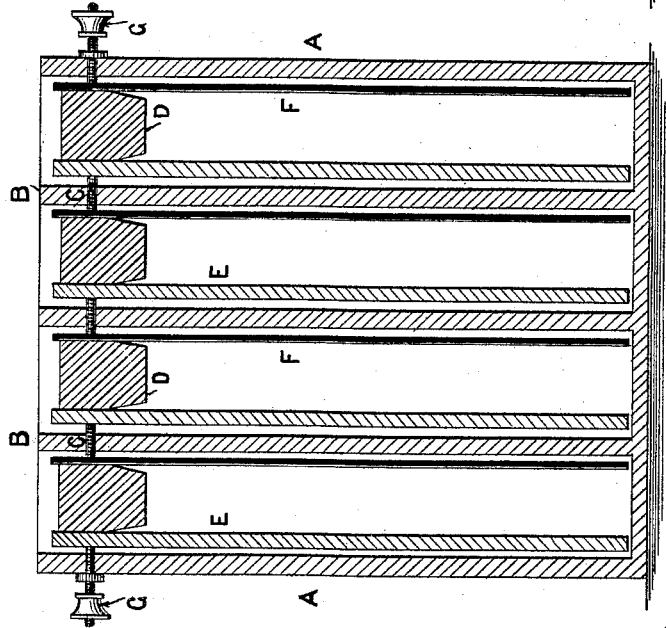
Witnesses
T. E. Halford
C. P. Hammond
Inventor
T. Coad
By T. Prince
Attorney (No Model.) 2 Sheets—Sheet 2.

T. COAD.
VOLTAIC BATTERY.

No. 395,769. Patented Jan. 8, 1889.

Witnesses
T. E. Halford
C. P. Hammond

Inventor
T. Coad
By F. Prince
Attorney

United States Patent Office.

THEOPHILUS COAD, OF FOREST GATE, COUNTY OF ESSEX, ENGLAND.

VOLTAIC BATTERY.

SPECIFICATION forming part of Letters Patent No. 395,769, dated January 8, 1889.

Application filed August 6, 1888. Serial No. 282,044. (No model.)

*To all whom it may concern:*

Be it known that I, THEOPHILUS COAD, a subject of the Queen of Great Britain, residing at Forest Gate, county of Essex, England, have invented certain new and useful Improvements in Connections for Voltaic Batteries, of which the following is a specification.

This invention relates to an improved device for connecting the positive and negative electrodes of a battery together in place of the usual terminals and wires, being equally applicable to single or double fluid batteries; and it consists in arranging a piece of conductive metal, passing from one cell to another and pressing or holding the electrodes against such metal, by which perfect contact is obtained and great facility afforded for the removal of the elements.

To enable my invention to be properly understood, I will proceed to fully describe the same with aid of the accompanying drawings.

Figure 6:
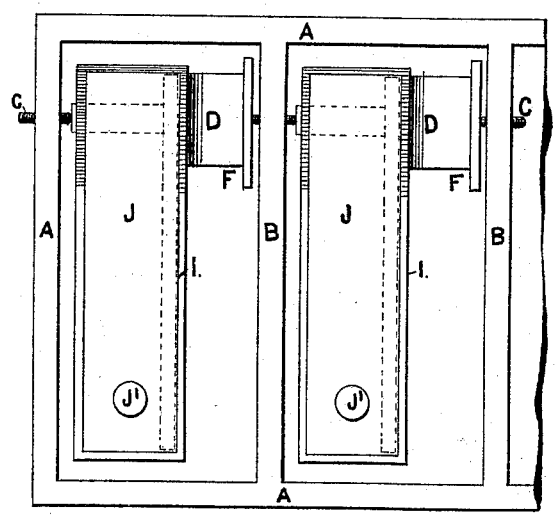
Figure 5:
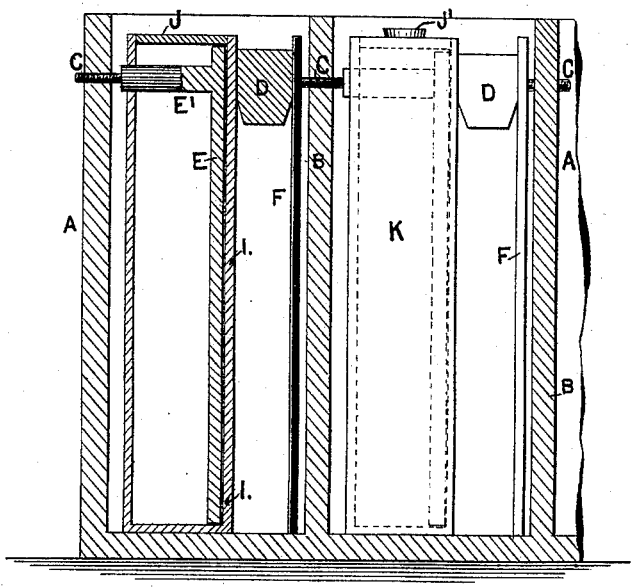

Figure 1 is an end elevation of a battery; Fig. 2, a sectional side elevation at line $x\,y$, Fig. 1; Fig. 3, a detached view of a part embodied in Fig. 2; Fig. 4, a partial view of Fig. 2, with a modification of contact parts; Fig. 5, a partial sectional side elevation of a double-fluid battery; Fig. 6, a plan of Fig. 5.

The cells are preferably formed together of vulcanite, A being outside of a case of cells, and B partitions to divide A into separate cells. Through each partition near the top I screw a platinum peg, C, or attach a bent-over piece, H, in such a way that there will be a slight projection of the metal beyond each side of partitions B, and press the carbon E and zinc F against the contact metal by means of a wedge, D, or clip M, of vulcanite or other suitable material. At each end of case A usual terminals, G, are arranged for the wires. The cells are closed by any suitably-arranged cover.

Referring to Figs 5 and 6, I is the porous pot, closed by a cemented-in top, J, in which is a hole, J', for filling, closed by a cork. The carbon E within the pot is fitted with a side arm, E', projecting slightly through side of pot for contact, as has been described.

Having fully described my invention, what I desire to claim and secure by Letters Patent of the United States is—

In a voltaic battery, the device for connecting the positive and negative electrodes, consisting of the combination, with a piece of conductive metal held in or to the sides of the containing-cells and passing from one cell to another cell, of the wedge D or equivalent, as and for the purposes set forth.

THEOPHILUS COAD.

Witnesses:
CHAS. BERKLEY HARRIS,
  *Notary Public, London.*
PERCY K. WOODWARD,
  28 *Southampton Buildings, London, W. C.*